(No Model.)
2 Sheets—Sheet 1.
A. C. PAYNTON.
CLEANING ATTACHMENT FOR RAKES.
No. 554,722.
Patented Feb. 18, 1896.
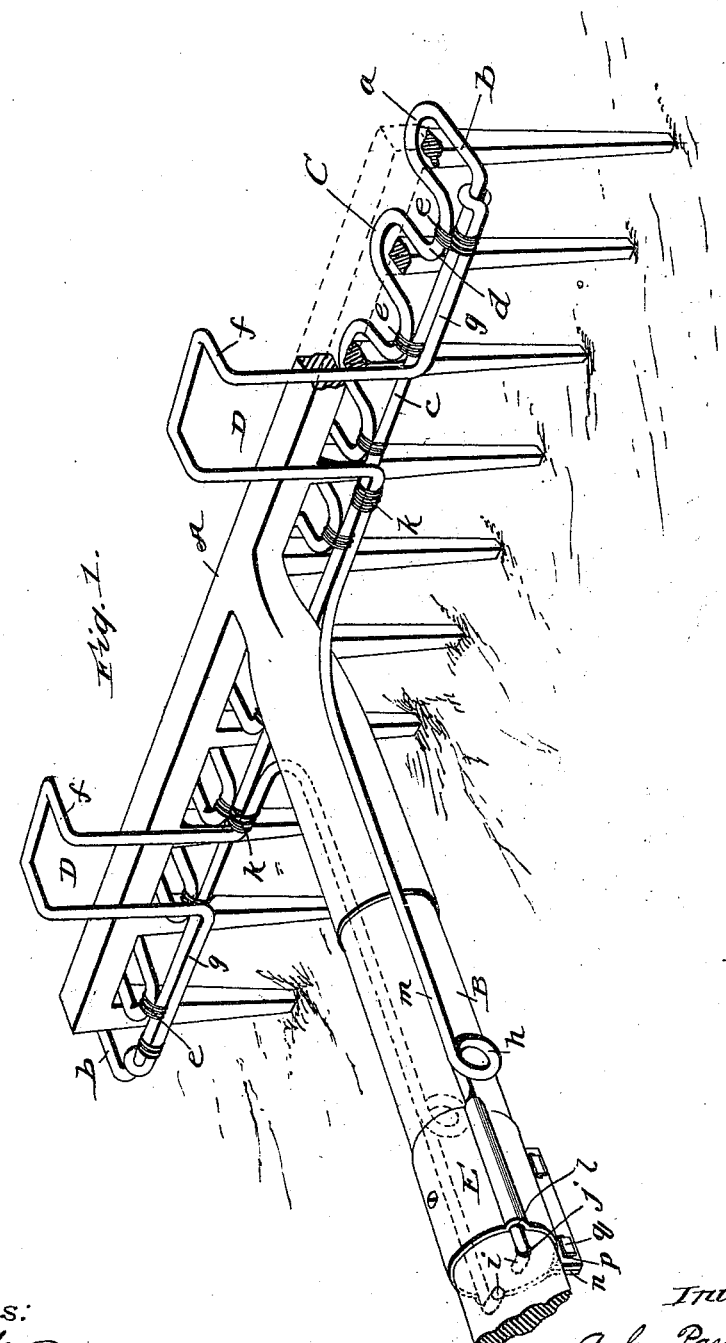
Witnesses:
Inventor
A. C. Paynton
By James J. Sheehy
Attorney (No Model.) 2 Sheets—Sheet 2.
A. C. PAYNTON.
CLEANING ATTACHMENT FOR RAKES.
No. 554,722. Patented Feb. 18, 1896.
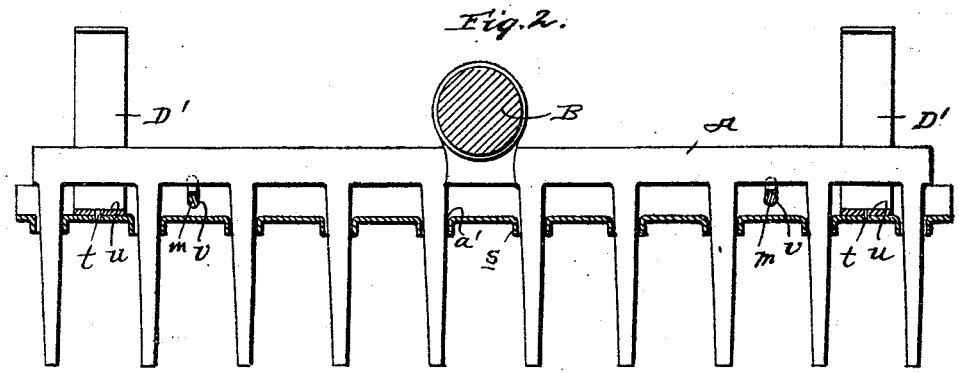
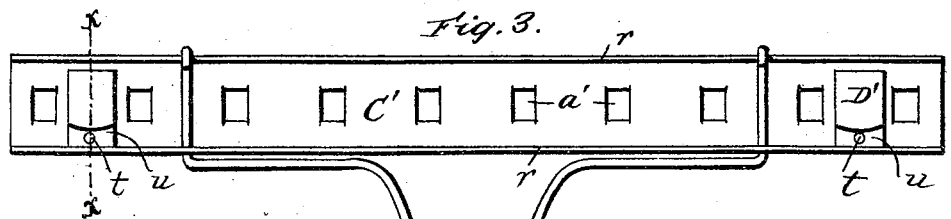
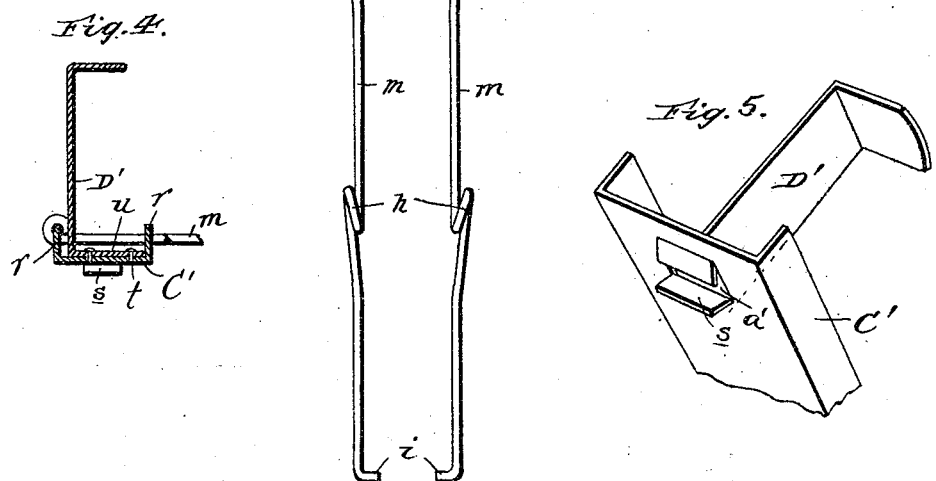
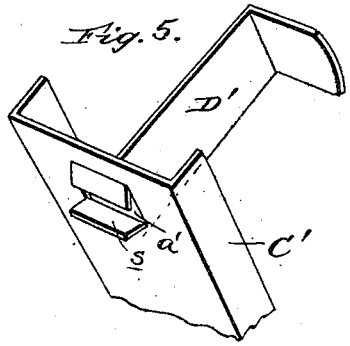
Witnesses:
Inventor
A. C. Paynton.
By James J. Sheehy
Attorney

UNITED STATES PATENT OFFICE.

ANDREW C. PAYNTON, OF BOISE, IDAHO.

CLEANING ATTACHMENT FOR RAKES.

SPECIFICATION forming part of Letters Patent No. 554,722, dated February 18, 1896.

Application filed June 24, 1895. Serial No. 553,915. (No model.)

*To all whom it may concern:*

Be it known that I, ANDREW C. PAYNTON, a citizen of the United States, residing at Boise city, in the county of Ada and State of Idaho, have invented certain new and useful Improvements in Cleaning Attachments for Lawn and Garden Rakes; and I do declare the following to be a full, clear, and exact description of the invention, such as will enable others skilled in the art to which it appertains to make and use the same.

This invention relates to an improvement in cleaning attachments for lawn and garden rakes, and the novelty and advantages will appear from the following description and claims when taken in connection with the accompanying drawings, in which—

Figure 1 is a perspective view of my improvements, showing the same applied to a rake with a part of the head and a part of the handle broken away. Fig. 2 is a longitudinal sectional view of my improvements, taken through the handle of the rake and illustrating a modification. Fig. 3 is a plan view of the improvements removed from the rake. Fig. 4 is a cross-sectional view taken in the plane indicated by the dotted line $x$ $x$ on Fig. 3. Fig. 5 is a perspective detail view looking at one end of the improvement.

Referring by letter to said drawings, A indicates the head, and B the handle, of an ordinary hand-rake, and which rake forms no part of my invention, but is here shown for the purpose of better illustrating the application of my improvements thereto.

While I prefer to make the invention entirely from steel wire or the like, yet it may in some cases be made of sheet metal or other flat material.

Referring more particularly to Fig. 1 of the drawings, C indicates the cleaner-bar. This bar is formed from a piece of wire of sufficient length by bending it backward and forward alternately in a zigzag or serpentine manner, so as to form a horizontal loop $a$ for each tooth of the rake. After forming the desired number of bends the wire is then carried transversely at the end and in a straight manner, as shown at $b$, after which it is carried longitudinally, as shown at $c$, to the other end of the device. I then secure the bend $d$ between each loop $a$ to the straight longitudinal bar or rod $c$ by means of light wire $e$ or other suitable material, by which the parts are wrapped together. It is obvious, however, that the connection may be made in various ways. This cleaner-bar is designed to be placed over the teeth, so that one tooth will go through each loop $a$, and the whole will rest snugly against the under side of the head A.

In attaching the holder-bar to the rake I employ two pieces of wire, and, as each is similar, a description of one will answer for both. In forming these attaching portions I take a piece of wire of a sufficient gage and form an angular loop D at a sufficient distance from one end, and bend the branches of the loop in a rectangular manner, as shown at $f$. I then carry one end of the material horizontally, as shown at $g$, and which branch is hooked or otherwise attached to the straight portion C of the cleaner-bar, and near one end thereof, the angular loop D assuming a vertical position with its angular branches $f$ overhanging the rake-head. The wire is carried from said angular loop in a curved manner and up the opposite sides of the handle, where it is turned into a coil or eye $h$, and terminates in angular branches $i$, which are let into holes or apertures $j$ of the handle. These attaching wires, and in which the bumpers are formed by the loops B, are secured to the straight rod or bar $c$ of the cleaner by means of light wire $k$ wrapped around both members. By this construction it will be seen that the cleaner-bar will be held snugly against the under side of the rake-head and out of the way when the rake is in use.

E indicates a band of sheet metal, which is designed to secure the spring-arms of the attachment to the rake-handle. This band is grooved longitudinally at diametrically-opposite points, as shown at $l$, to receive the branches of the wires $m$, and as a convenient means of securing the free ends of the band together, so that it may be readily connected to any ordinary rake-handle, I turn a flange $n$ on opposite longitudinal edges of the band and provide slots in one of the flanges, as shown at $p$, and displace the material of the other, so as to form tongues $q$, which are let into the slots $p$ and bent or turned down.

In the modification shown on Sheet 2 of the drawings I make the cleaner-bar C' out of flat material, and for the sake of cheapness I would make it out of light sheet metal. In thus constructing the device I would take a piece of sheet metal of sufficient length and width and bend it so as to form flanges r on its longitudinal edges, which are disposed upwardly. I then stamp the same in its longitudinal center and at suitable points, so as to form holes or apertures a' for the passage of the rake-teeth. In punching these apertures I would not remove any of the material, but simply displace the same and bend the same downwardly, as shown at s, so as to strengthen the plate and serve as guides for the cleaner-bar on the rake-teeth. This cleaner-bar assumes a position beneath the head of the rake similar to the construction shown in Fig. 1 of the drawings, and is attached to the handle of the rake by rods and a band, the same as that shown in the last-named figure. In the modification, however, I do not form the bumpers on the attaching-rods, but provide bumpers D', which are made from cast-iron or the like shaped in an angular form and secured to the cleaner-bar by means of rivets t or the like taking through the flange u in the base of the bumpers and into the cleaner-bar. The wires m are attached to the sheet-metal cleaner-bar by taking through two aligned apertures v in the flanges r of the bar C'.

It will be seen that the attachment is normally held snugly against the under side of the rake-head, and when the teeth become filled or clogged with leaves or other trash it is simply necessary to invert the head and strike the bumpers upon the ground or other substance, when the holder-bar will be forced down on the teeth and displace such trash as may have accumulated thereon, so as to free the teeth therefrom. When pressure is relieved from the head while in the inverted position, the rake may be again turned and used as a rake.

Having described my invention, what I claim is—

1. The combination of a rake having sockets j, in opposite sides of its handle, the band E, of sheet metal mounted and secured on the handle and having the opposite grooves l, at intermediate points of its length and also having a flange at one end provided with slots and a flange at its opposite end provided with tongues designed to take through the slots of the other flange so as to secure the ends of the band together, a cleaner-bar receiving the teeth of the rake, and the spring-arms arranged on opposite sides of the rake-handle and connected at one end to the cleaner-bar and extending through the grooves l, of band E, and having angular branches at their opposite ends seated in the sockets j, of the handle, substantially as and for the purpose set forth.

2. The rake attachment described, formed of wire and comprising the cleaner-bar having the straight portion c, adapted to rest on one side of a series of rake-teeth, the portion formed integral with the portion c, and bent to form the loops a, adapted to receive the teeth of a rake, and connections e, between the bent portion and the straight portion c, at points between the loops a, and the bumpers D, and spring-attaching arms formed by connecting pieces of wire to the straight portion c, of the cleaner-bar, then carrying said pieces of wire horizontally inward as indicated by g, then upwardly and laterally to form the branches f, of the bumpers D, then downwardly to the plane of the cleaner-bar and connecting them again with the portion c, and finally carrying them rearwardly in parallel positions so as to enable them to receive a rake-handle between them, all substantially as specified.

In testimony whereof I affix my signature in presence of two witnesses.

ANDREW C. PAYNTON.

Witnesses:
H. W. SEWALL,
JOHN O'BRIEN.